United States Patent [19]
Humphrey

[11] Patent Number: 4,936,063
[45] Date of Patent: Jun. 26, 1990

[54] FRAME FLANGES FOR MOUNTING PHOTOVOLTAIC MODULES DIRECT TO ROOF STRUCTURAL FRAMING

[76] Inventor: John B. Humphrey, 456 Plymouth Ridge Rd., Ashtabula, Ohio 44004

[21] Appl. No.: 363,594

[22] Filed: May 19, 1989

[51] Int. Cl.$^5$ .............................................. E04B 7/18
[52] U.S. Cl. ...................................... 52/200; 52/553; 126/450
[58] Field of Search ................. 52/200, 398, 399, 788, 52/790, 553, 506, 90; 126/417, 450

[56] References Cited

U.S. PATENT DOCUMENTS

| | | | |
|---|---|---|---|
| 3,417,527 | 12/1968 | Kiekhaefer | 52/200 |
| 4,173,854 | 11/1979 | Wallerstein | 523/200 |
| 4,190,987 | 3/1980 | Naidus | 52/200 |
| 4,468,899 | 9/1984 | Miller | 52/200 X |
| 4,712,338 | 12/1987 | Trickel | 52/90 |
| 4,730,426 | 3/1988 | Weisner et al. | 52/533 X |

FOREIGN PATENT DOCUMENTS 329573  8/1989  European Pat. Off. .............. 52/200

Primary Examiner—Richard E. Chilcot, Jr.
Attorney, Agent, or Firm—Mason, Fenwick & Lawrence

[57] ABSTRACT

A flange for photovoltaic module frames is disclosed comprising water drainage channels formed by two overlapping flanges, antiwicking grooves in two other overlapping flanges, with nailing slots in the flanges.

4 Claims, 3 Drawing Sheets

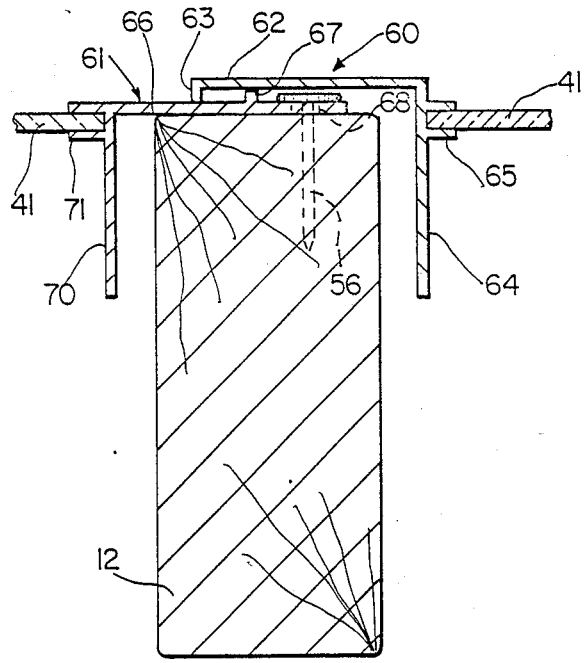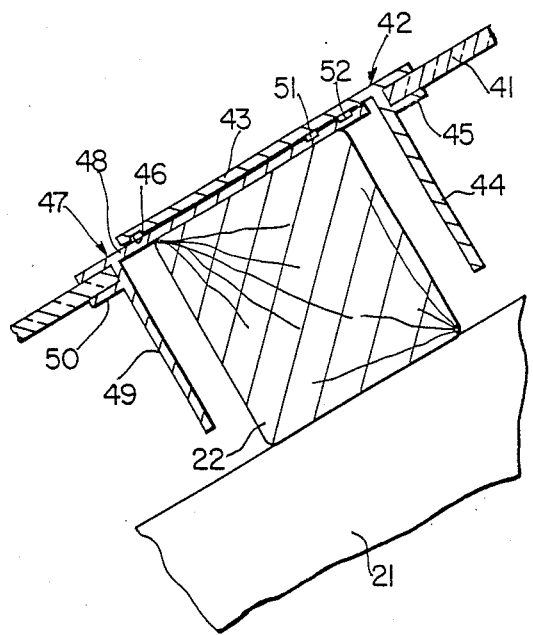
FIG. 3
FIG. 4
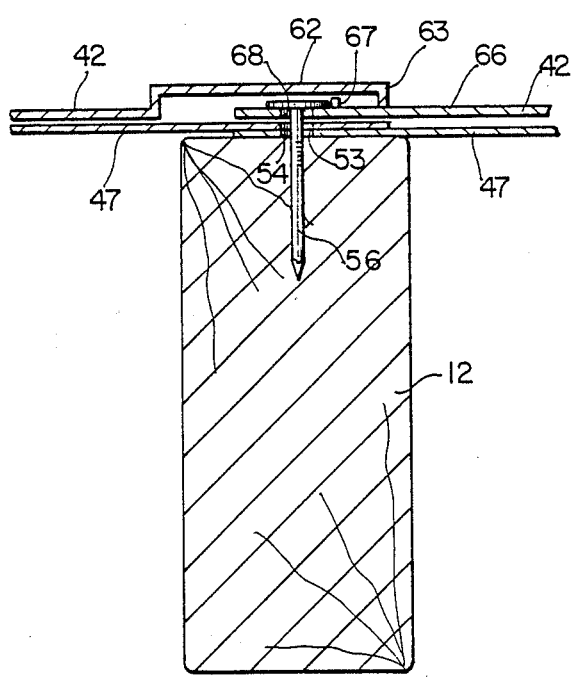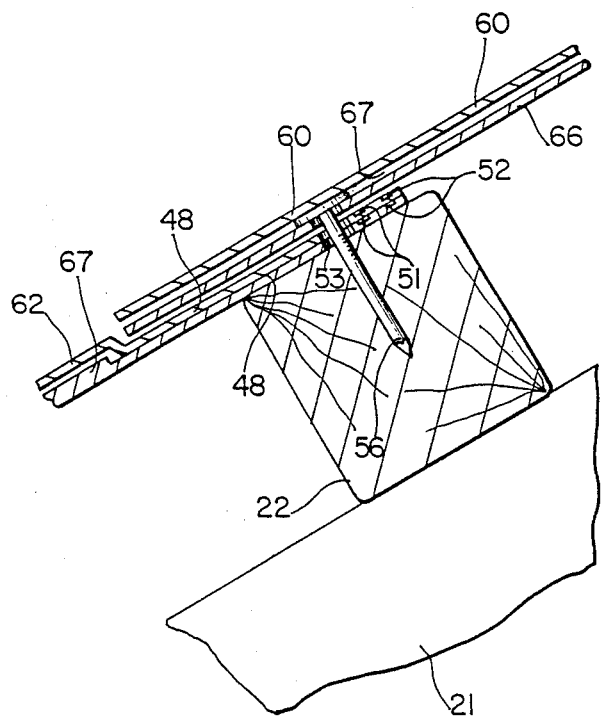
FIG. 5
FIG. 6

FRAME FLANGES FOR MOUNTING PHOTOVOLTAIC MODULES DIRECT TO ROOF STRUCTURAL FRAMING

BACKGROUND OF THE INVENTION

This invention relates to the installation of photovoltaic modules directly to roof framing members, bypassing the construction and installation of separate rack superstructures.

There has existed for many years now, in the field of photovoltaic generation of electricity, a need for a simple, inexpensive, reliable method of attaching photovoltaic modules directly to roof framing members. In spite of continual predictions that this would soon be common practice, it has not become so. Instead the most common practice in roof mounting of photovoltaic modules has been to design, drill and bolt up angle iron into a rack to accept whatever size module has been purchased. Then to penetrate the roof covering in locations where framing members underlie the roof sheathing, to lag screw or preferably bolt the rack through frame members. The present methods of mounting photovoltaic modules onto roofs is somewhat expensive and very time consuming, at least when compared to the expense of, and time required to drive three roofing nails per module; and the present methods are prone to leaks at the roof covering penetrations Photovoltaic modules, to operate efficiently, must be provided with good air circulation front and back, because about 90% to 95% of the light absorbed is converted to heat, not electricity, and, as the temperature rises, the electricity production reduces rapidly. People who do not realize how severe the effect is sometimes attach the modules directly to the roofing materials and in addition to exposure to leakage of water through the roof, suffer poor electrical production, and rapid degradation of the roofing materials.

An additional problem that had to be addressed in photovoltaic module installations has been that of providing sufficiently weatherproof electrical connections to minimize corrosion and degradation of the connection which has been a more serious problem in low voltage direct current wiring than in high voltage alternating current wiring.

From time to time attempts have been made to secure existing modules directly to roof framing members or to special added support members by adopting methods used in glazing sun space roofs. These methods eliminate the labor and materials of the fabrication and installation of special racks and the labor and materials needed to sheath and shingle a roof. Unfortunately, like sunspaces, unless very carefully engineered with expensive materials and installed with great care by skilled technicians, there is a high probability and in fact, near certainty that joints between modules will develope leaks. The continual expansion and contraction of the modules, as with glass and plastic glazing materials, is almost certain to open up any caulking or sealing method except for the very best and most carefully applied installations. Accepted standard framing practices assure that roof framing members will not be precisely enough positioned to permit standardized cap and sealing strip pieces to adequately seal the edges of heretofore manufactured photovolatic module frames.

Therefore it is the primary object of this invention to provide for the first time for the fastening of photovoltaic modules to ordinarily well installed roof framing with built in tolerance for normal variations.

Another object of this invention is to provide for installation of photovoltaic to nonstandard or substandard framing by adding common purlins.

Another object of this invention is to provide a tolerance for differential movement between framing members, between photovotaic modules, and between members and modules, caused by hot/cold cycling and by damp/dry cycling.

A further object of this invention is to provide a module installation which reduces the high labor and material costs associated with previous panel installations. Photovoltaic modules with the new flanges on their frames can be installed by any one who can carry a pocket full of nails and aim a hammer reasonably well. No more draping power cords onto the roof, no more drills, socket wrench sets, etc. No more guessing at the location of framing members. No more patching holes in roof coverings when the frame member is missed.

Another object of this invention is to reduce the expense and difficulty of making the electrical connections and of the wiring itself. Connection methods and wire suitable to interiors may be used instead of connections, methods and wire required to weatherproof exterior work.

Another object of this invention is to permit easy electrical isolation, and checking of individual modules. Access to the electrical connections is possible in any weather.

Another object of this invention is to permit easy removal and replacement of individual modules. This can be accomplished from either the top or from under the modules using ordinary hand tools.

An additional object of this invention is to permit installation of photovoltaic modules to virtually any properly pitched roof in which the framing members pretend to be in a single plane, even when the spacing of the members is not standard, by the addition of purlins on standard spacing.

Another object of this invention is to eliminate the expense and inherent problem of specially constructed roof racks.

Another object of this invention is to eliminate the expensive and unreliable caulking and sealing methods previously employed in direct to framing member installations.

A still further object of this invention is to assure adequate ventilation of both sides of the photovoltaic modules without the awkward and expensive methods previously employed.

Another object of this invention is to allow the use of standard readily available peak and eaves ventilating systems to cool the modules, or additional cooling air may be forced to flow past the underside of the modules by using standard gable or roof ventilating fans and controls, or the hot air may be used for interior heating purposes rather than being dumped directly outside.

Achievment of the objects of the invention is enabled through the addition of a specially formed set of flanges to a common photovoltaic module frame extrusion. The specially formed flanges eliminate the need to caulk or seal against the passage of water by inclusion of antiwicking grooves and drainage channels.

DESCRIPTION OF THE DRAWINGS

FIG. 3 is a cross sectional view as seen at 1—1 in FIG. 1 of the side overlap of flanges of adjacent photovoltaic module frames showing the lips which form channels to limit horizontal movement of water.

FIG. 4 is a cross sectional view as seen at 2—2 in FIG. 2 of the overlap of upper/lower adjacent photovoltaic module frames showing the anti-wicking horizontal grooves which eliminate the possibility of movement of water up over the upper flanges of the lower photovoltaic modules.

FIG. 5 is a cross sectional view as seen at 3—3 in FIG. 1 showing all four flanges at a rafter with a fastener installed through a fastener slot.

FIG. 6 is a cross sectional view as seen at 4—4 in FIG. 2 showing all four flanges at a purlin with a fastener installed through a fastener slot.

DETAILED DESCRIPTION OF A PREFERRED EMBODIMENT

Figure 1:
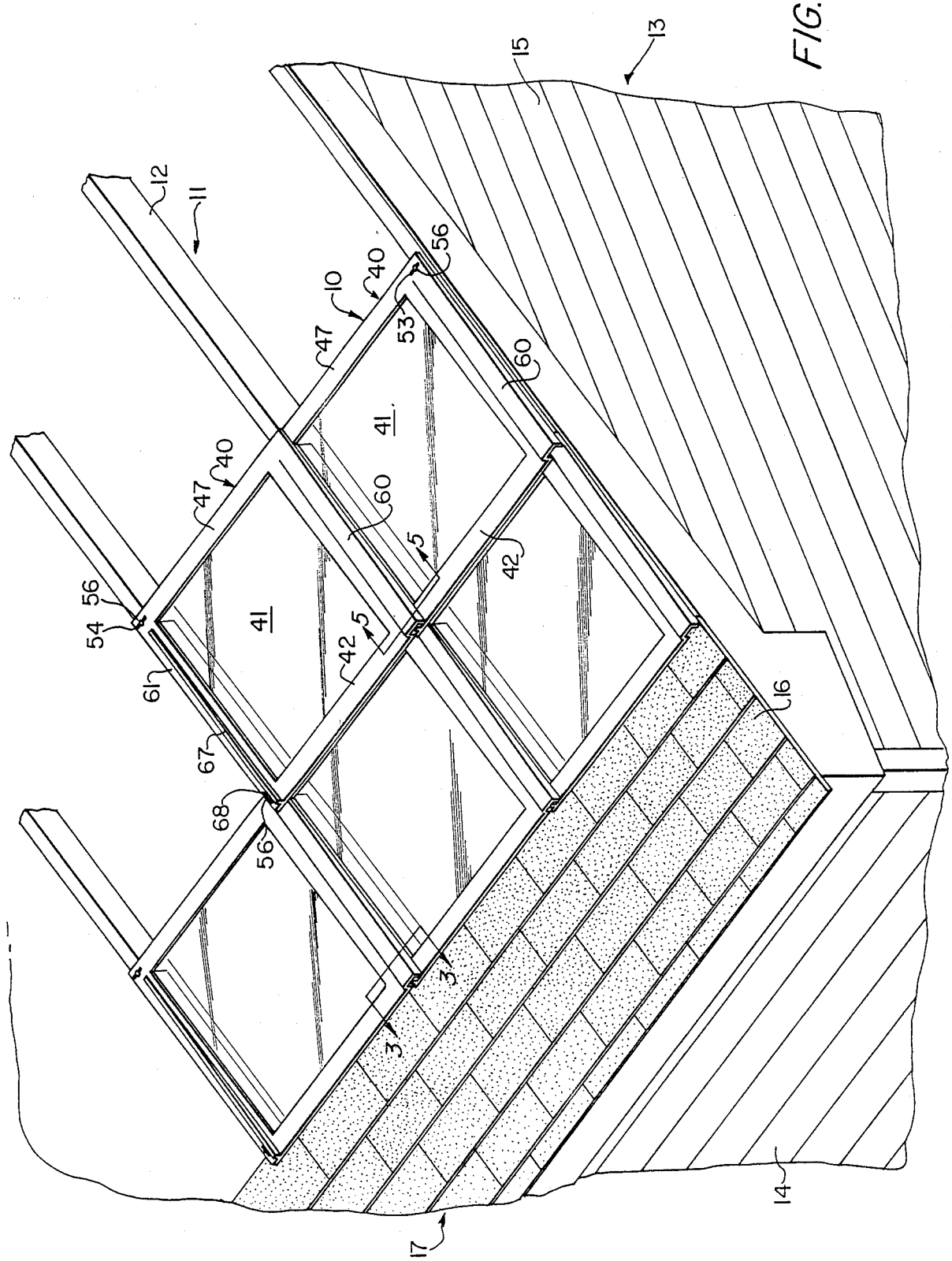
FIG. 1 is a perspective view of the preferred embodiment of the present invention installed on the roof rafters of a conventional frame pitched roof such as exists on most residential dwellings.

The preferred embodiment of the invention provides frame flanges for mounting photovoltaic modules 10 directly to roof structural framing members 11 as shown in FIG. 1 where the roof rafters 12 are on conventional 16 inch centers on building 13 having a rear wall 14 and a side wall 15 with conventional asphalt shingles 16 on the lower edge of the roof 17.

Figure 2:
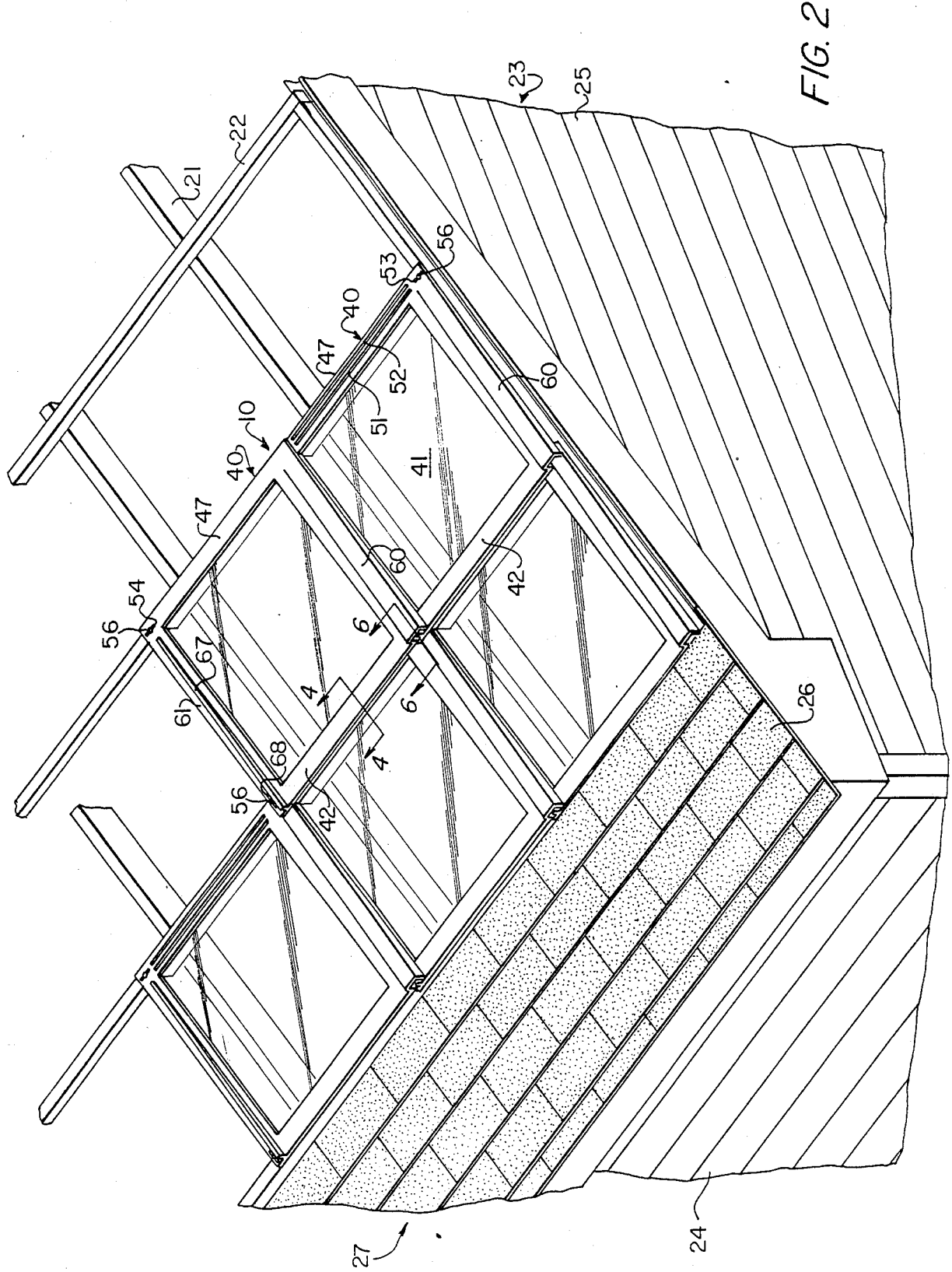
FIG. 2 is a perspective view of the preferred embodiment of the present invention installed on purlins attached to the roof rafters on a conventional frame pitched roof which may be used where the rafters are not conventionally spaced.

An alternate installation of the invention as shown in FIG. 2 permits installation of the photovoltaic modules 10 to virtually any properly pitched roof in which the framing members create a single roof plane, even where the spacing of the roof rafters 21 are not standard, by the addition of purlins 22 separated by standard spacing on building 23 having a rear wall 24 and a side wall 15 with conventional asphalt shingles 26 on the lower edge of the roof 27.

The photovoltaic modules 10 includes a frame 40 generally of stamped or extruded aluminum construction having photovoltaic panels 41 of conventional photovoltaic cells electrically connected in the conventional manner on the interior side of the modules thereby avoiding the expense and difficulty of using exterior weatherproof methods.

Referring to FIG. 4, the frames 40 include a lower side member 42 of generally L-shaped configuration having a lower overlap member 43, a lower side reinforcing member 44 and a U-shaped channel 45 on the upper portion of the lower side reinforcing member 44 for retaining the photovoltaic panel 41 within the module 10. The lower overlap member 43 includes an anti-wicking horizontal groove 46 to eliminate the possibility of movement of water up over the upper flanges of lower photovoltaic modules.

Referring to FIGS. 4 and 1 extending across the entire upper edge of the frames 40 are upper side member 47 of generally L-shaped cross section having an upper overlap member 48, an upper reinforcing member 44 extending centrally of the upper side member 47 and a U-shaped channel 50 on the upper portion of the upper reinforcing member 44 for retaining the photovoltaic panel 41 within the frame 40. Upper anti-wicking horizontal grooves 51 and 52 extend across the frames 40 on the upper surface of upper overlap member 48 to prevent movement of water up over the upper flange of lower photovoltaic modules. As shown in FIGS. 1, 2, 5, and 6, nailing slots 53 and 54 in the upper overlap member 47 receives a mounting nail 56 which is used in three corners of the modules to mount the modules to the roof rafter 12 or purlins 22.

As seen in the FIGS. 1 and 2, on the frames 40 are the right side member 60 and the left side member 61. The right side member 60 is of generally L-shaped cross section having a right side overlap member 62 with a downwardly turned outer end 63 which contracts the left side member 61 of an adjacent module to reduce the horizontal movement of water on roof. Downwardly projecting from the opposite end of the right side overlap member 62 is a right side reinforcing member 64 having a U-shaped channel 65 on the upper end thereof for retaining the photovoltaic panel within the module 10.

The left side member 61 of the frame 40 is also of generally L-shaped cross section having a left side overlap member 66 with a drainage channel ridge 67 intermediate thereof and a nailing slot 68 at the outer end thereof to receive the mounting nail 56 used to mount the modules to the roof rafters 12 or purlins 22. Extending downwardly from the left side member 66 is the left side reinforcing member 70 having a U-shaped channel 71 on the upper end thereof to retain the photovoltaic panel 41.

From the foregoing detailed description, it will be evident that there are a number of changes, adaptations and modifications of the present invention which will be obvious to those of skill in the art. Therefore, the spirit and scope of the invention is to be limited solely by the appended claims.

I claim:

1. Frame flanges for mounting photovoltaic modules directly to roof structural framing comprising a means for retaining a photovoltaic panel, means for mounting said retaining means directly to roof structural framing, flange means on said retaining means for preventing wicking of water between said modules when said modules are mounted adjacent each other on a roof, and means for preventing drainage of water between modules when said modules are mounted adjacent each other on a roof, thereby permitting the fabrication of an integral roof formed of photovoltaic modules while improving cooling of the modules and decreasing the expense of construction.

2. The frame flanges of claim 1 wherein said means for preventing wicking of water includes at least one groove on an upper edge and one groove on a lower edge of said retaining means.

3. The frame flanges of claim 1 wherein said means for preventing drainage of water between modules includes a first flange on one edge of said retaining means with said first flange having a downwardly projecting outer end, and includes a second flange on an opposite edge of said retaining means with said second flange having a drainage channel ridge to form a drainage channel with the downwardly projecting outer end of said first flange when said modules as mounted adjacent one another.

4. The frame flanges of claim 1 wherein said means for mounting said retaining means includes at least one opening through said retaining means and an attaching means insertable through said opening for attaching the frame flanges to roof structural framing.

* * * * *